UNITED STATES PATENT OFFICE 2,528,934

ADHESIVE COMPOSITION CONTAINING A FLUIDIZED GLYCIDYL ETHER AND AN AMPHOTERIC OXIDE

Quentin T. Wiles, Lafayette, Calif., assignor to Shell Development Company, San Francisco, Calif., a corporation of Delaware No Drawing. Application April 29, 1949, Serial No. 90,543

8 Claims. (Cl. 106—287)

This invention relates to a composition adaptable for adhesive purposes containing a semisolid to solid glycidyl ether fluidized with a mono-epoxy compound and in admixture with a comminuted amphoteric oxide.

Glycidyl ethers of polyhydric phenols may be obtained by reacting epichlorhydrin with a polyhydric phenol and a base. Upon addition of a hardening agent, these glycidyl ethers of polyhydric phenols cure without heating at ordinary atmospheric temperature to resinous materials of excellent physical and adhesive strength. However, such glycidyl ethers are either solid or substantially solid at such ordinary atmospheric temperatures. When employed for adhesive purposes, it is necessary that the glycidyl ether containing the hardening agent be at least spreadably fluid in order that it can be applied to surfaces desired to be united. The glycidyl ether may be heated to spreadable consistency and applied in this molten condition, but such a procedure is undesirable especially since the ether is capable of curing at ordinary atmospheric temperature. Obtaining fluidity by incorporation of an inert volatile solvent with the glycidyl ether is not practicable since the solvent cannot evaporate from the composition contained as an adhesive layer between usually impervious surfaces of objects being glued together. Moreover, the presence of even minute proportions of such volatile solvents retained in the ether greatly reduces the strength of the cured resin. Likewise, use of inert non-volatile solvents such as dibutyl phthalate to obtain fluidity also is unsatisfactory because the cured resin therefrom similarly has poor strength.

I have now discovered that by incorporating a fluidizing proportion of a normally liquid, substantially non-volatile mono-epoxy compound with the substantially solid glycidyl ether of a polyhydric phenol and admixing therewith an appreciable proportion of powdered amphoteric oxide, there is obtained a spreadably fluid composition which, upon addition of a hardening agent, cures without heating at atmospheric temperature to hard material of great physical and adhesive strength while also being very resistant to weakening effects of heat or contact with water.

In the composition, the glycidyl ether has a 1,2-epoxy equivalency greater than 1.0 so as to be capable of curing to an infusible resinous material. The fluidizing mono-epoxy compound, on the other hand, contains but a single epoxy group and is thus not capable of being resinified to an infusible three-dimensional polymer. Nevertheless, its presence does not adversely affect the physical properties of the cured composition. In fact, it remains in the composition by being substantially non-volatile in having a boiling point of at least 100° C. and its presence therein quite unexpectedly materially improves the impact strength and water resistance of the cured composition.

Moreover, the powdered amphoteric oxide is chemically inactive in the composition even during curing. While it functions as a solid diluent therein, the physical properties of the cured composition are greatly enhanced by the presence of the amphoteric oxide although incorporation of other inert solids adversely affect the physical properties.

The glycidyl ethers of dihydric phenols employed in the composition are obtained by reacting at about 50° C. to 150° C. one to two or more moles of epichlorhydrin with a mole of dihydric phenol in the presence of a base such as sodium, potassium, calcium or barium hydroxide in amount of about 10 to 30% stoichiometric excess of base to epichlorhydrin—i. e., 1.1 to 1.3 equivalents of base per mole of epichlorhydrin. The reaction is effected in aqueous medium by first mixing together the water, dihydric phenol and the base, which mixture is then heated. The epichlorhydrin is added rapidly as a whole and heating is continued with agitation for several hours to convert the reactants to a taffy-like mass. If desired, the base may be added in portions during the course of the reaction. While hot, the agitated reaction product is washed with water until free of base. Although the product is a complex mixture of glycidyl ethers, the principal product may be represented by the formula:

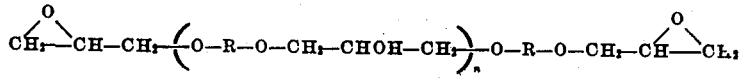

wherein R represents the divalent hydrocarbon radical of the dihydric phenol and $n$ is of the series 0, 1, 2, 3, etc. The length of the chain can be made to vary by changing the molecular proportion of epichlorhydrin to dihydric phenol. Thus by decreasing the moles of epichlorhydrin per mole of dihydric phenol from about 2.0 downwards toward 1.0, the molecular weight and the softening point of the resinous glycidyl ether is increased. In general, these glycidyl ethers have an epoxy equivalency between one and two, contain terminal 1,2-epoxy groups and have alternate aliphatic and aromatic nuclei linked together by ethereal oxygen atoms.

Any of the various dihydric phenols are suitable for preparation of the glycidyl ethers including mononuclear phenols like resorcinol, catechol, hydroquinone, etc., or polynuclear phenols like bis-phenol—i. e., bis-(4-hydroxyphenyl)-2,2-propane, or 4,4'-dihydroxybenzophenone, bis - (4 - hydroxyphenyl) - 1,1 - ethane, bis -(4-hydroxyphenyl)-1,1-isobutane, bis-(4-hydroxyphenyl) - 2,2 - butane, bis - (4 - hydroxy - 2-methylphenyl) - 2,2 - propane, bis - (4 - hydroxy-2-tertiarybutylphenyl)-2,2-propane, bis-(2-hydroxynaphthyl)-methane, 1,5-dihydroxynaphthalene, etc.

The following examples illustrate preparation of typical glycidyl ethers employed in the compositions of the invention, wherein the parts are by weight.

EXAMPLE I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water of 20 to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and an epoxide equivalent weight of 249. For convenience this product will be referred to hereinafter as Epoxy Resin I.

EXAMPLE II

Instead of using 2.6 mols of epichlorhydrin per mole of bis-phenol as described in the above example, there was employed only 2.0 moles of epichlorhydrin per mole of bis-phenol. About 798 parts of bis-phenol were dissolved in a caustic soda solution made by dissolving 200 parts of sodium hydroxide in 1730 parts of water in a stainless steel closed kettle. Epichlorhydrin in amount of 650 parts was then added in one portion to the closed kettle, the mixture being stirred during the addition. The temperature rose from 37° C. to 70° C. in 45 minutes. Caustic soda, 80 parts in 200 parts of water, was then added whereupon the temperature rose to about 82° C. during a further 30 minutes. Additional caustic soda, 29 parts in 100 parts of water, was then added and the kettle contents were heated. The temperature of the reaction mixture was gradually increased to about 95° C. in approximately 30 minutes. The aqueous liquor was next drawn off from the taffy-like product which had formed. The latter was washed with hot water while agitated and a series of washing treatments applied until the water was neutral to litmus. The product was then dried by heating to a final temperature of 130° C. and removed from the kettle. The softening point of the resulting glycidyl ether was 43° C. by Durran's Mercury Method and the epoxide equivalent weight was 325. The average molecular weight measured ebullioscopically in ethylene dichloride was 510. This product will be known hereinafter as Epoxy Resin II.

The glycidyl ethers of a polyhydric phenol employed as principal resinifying constituent in the composition has a 1,2-epoxy equivalency greater than 1.0, and is usually between 1.0 and 2.0. The 1,2-epoxy equivalency is the value obtained upon dividing the average molecular weight of the ether by the epoxide equivalent weight thereof. Thus the epoxy equivalency of Epoxy Resin II was 1.57.

The epoxide equivalent weight of the glycidyl ethers of polyhydric phenols is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenol-phthalein end point. The epoxide value is calculated by considering one HCl as equivalent to one epoxide group. This method is used for obtaining all the epoxide values discussed herein.

The glycidyl ethers of polyhydric phenols employed as principal resinifying constituent in the compositions have a viscosity of at least 150 poises at 25° C. There is no particular upper limit for the viscosity to suitability although ethers having a melting or softening point above 160° C. by Durran's Mercury Method are rarely used. Thus the glycidyl ethers have a viscosity of at least 150 poises at 25° C., but the viscosity may be so high that the ethers are solids at this temperature. Best results are obtained with ethers having a Durran's Mercury Method melting point of from about 10° C. to 50° C. If these are glycidyl ethers of bis-phenol, they have an epoxide equivalent weight of about 225 to 400. In some cases, it may be desirable to use an ether having a melting point as high as 110° C.

The compositions of the invention contain sufficient normally liquid mono-epoxy compound mixed with the glycidyl ether of the polyhydric phenol that the composition has a spreadable fluidity at normal temperature. Ordinarily, it is preferred that the viscosity is about from 30 to 100 poises at 25° C. although it may be considerably less such as down as low as 3 poises. Most preferably, the viscosity is about 40 to 70 poises for suitable fluidity in adhesive applications, with which purpose the compositions are primarily concerned.

Since the compositions are particularly suited for use as adhesive wherein loss of the fluidity producing diluent in substantial quantity cannot be tolerated, it is essential that the normally liquid mono-epoxy compound be substantially non-volatile. It has been found that mono-epoxy compound with a boiling point of at least 100° C. is sufficiently non-volatile for this purpose, the boiling point being measured of course at 760 mm. of mercury. The mono-epoxy compounds employed as reactive diluents are mobile liquids at 25° C. In general, they are no more viscous than glycerine or preferably have a viscosity at 25° C. of less than 5 poises. Most of the compounds are not nearly so viscous as glycerine, many being only a little more viscous than water which has a viscosity of about 0.9 centipoise at 25° C. Thus, the viscosity of the mono-epoxy compounds is ordinarily from about 1 to 500 centipoises at 25° C.

The reactive diluents contain but a single epoxy group in order to realize the advantages of the invention. Besides proper boiling point and viscosity, this is the only essential limitation on the suitability of any particular compound although it is preferred that the compound be devoid of other groups reactive with glycidyl ethers.

In being a mono-epoxy compound, customary usage of the word epoxy is employed, namely, that the compound contains a structure in which an oxygen atom has the two bonds thereof linked to different saturated carbon atoms, which are vicinal carbon atoms or are linked directly together as is the case in the structure

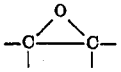

The epoxy groups may either be in terminal location or be interior groups. Among representative compounds suitable for the compositions are 2,3-hexylene oxide, 3,4-hexylene oxide, 3-ethyl-2,3-pentylene oxide, epichlorhydrin, epibromhydrin, octylene oxide, styrene oxide, glycide, decylene oxide and the like. Monoglycidyl ethers constitute a preferred class and include among others methyl, ethyl, isopropyl, allyl, crotyl, isoamyl, phenyl, o-tolyl, p-tolyl, thymyl and naphthyl glycidyl ethers.

The adhesive properties of the compositions including high strength with good water and heat resistance when cured are greatly aided by the presence of the granular amphoteric oxide. This inorganic solid is a substantially water-insoluble amphoteric oxide, i. e., has a solubility in pure water at 20° C. of less than 0.01%. Typical amphoteric oxides for use in the composition include the oxides of zinc, antimony, lead, aluminum, tin, iron and silicon or any desired combination thereof. Silicon dioxide is included as an amphoteric oxide because it is not only soluble in aqueous caustic, but is also soluble in hydrofluoric acid thus evidencing both acidic and basic properties.

The amphoteric oxide is utilized in comminuted form and the granular size may be varied considerably although it is preferred to employ passing a 10 mesh A. S. T. M. screen. Excellent results are obtained with 200 to 400 mesh granular amphoteric oxides.

In general, it is desirable to use about an equal amount of amphoteric oxide with the epoxide-containing constituents in the composition—i. e., about an added 100% of amphoteric oxide. However, other proportions may be employed if desired such as from about an added 25% to 200%. In general, an added 50% to 135% gives good results although the use of about an added 100% of amphoteric oxide gives cured compositions having better heat resistance than with those having lesser amounts.

Since the glycidyl ether of a dihydric phenol employed as primary resin-forming constituent in the composition is a very viscous to solid substance at ordinary temperature, it is preferred to first admix the liquid mono-epoxy compound therewith so as to obtain a fluid or mobile mixture before adding the granular amphoteric oxide. By following this order of comingling the ingredients, any necessity for heating is obviated. The mixing is effected to sufficient extent that substantial uniform distribution of both the organic and inorganic constituents is achieved. Mixing with the aid of a ball mill or dough mixer gives excellent uniformity.

It has also been found useful at times to include still another ingredient in the composition, namely, a polyglycidyl ether of a polyhydric alcohol. Preferably, this polyglycidyl ether is one which is liquid at normal temperature and in cases where the ether is a liquid of low viscosity like the polyglycidyl ether of glycerol, it is possible to dispense with the presence of the liquid mono-epoxy compound in the composition. The polyglycidyl ether in containing a plurality of glycidyl groups is capable of curing in the same manner as that of the glycidyl ether of a dihydric phenol and thus does not adversely affect the properties of the cured composition. In fact, its presence improves the properties. Among representative compounds for this purpose are such polyglycidyl ethers as diglycidyl ethers of ethylene glycol, propylene glycol, trimethylene glycol, butylene glycol, dithylene glycol, triethylene glycol, glycerol, tripropylene glycol, and the like as well as ethers containing more than two glycidyl groups such as the polyglycidyl ethers of glycerol, diglycerol, erythritol, pentaglycerol, pentaerythritol, mannitol, sorbitol, polyallyl alcohol, polyvinyl alcohol and the like. Such glycidyl ethers also have a 1,2-epoxy value greater than 1.0.

The polyglycidyl polyethers of the polyhydric alcohols are prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50° C to 125° C. with the proportions of reactants being such that there is about one mole of epichlorhydrin for each molecular equivalent of hydroxyl group in the polyhydric alcohol. Thus, in preparing the ether of diethylene glycol, which glycol contains two hydroxyl groups in each molecular thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of polyhydric alcohols may be illustrated by considering application of the above method to preparation of the polyglycidyl ether of glycerol.

EXAMPLE III

In parts by weight, about 276 parts of glycerol (3 moles) were mixed with 828 parts of epichlorhydrin (9 moles). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It had an epoxide value of 0.671 equivalents per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule. For convenience, this product will be known as "Epoxy Resin III."

Various proportions of the polyglycidyl ether of the polyhydric alcohol are used with the glycidyl ether of a dihydric phenol such as an added 0 to 200%. Good results are obtained with the polyglycidyl ether constituting about 30 to 60% of the resin-forming mixture. In compositions containing three reactive epoxy-containing substances, the composition contains about 50 to 80% of the glycidyl ether of a polyhydric phenol, about 10 to 40% of the polyglycidyl ether of a polyhydric alcohol, and 1 to 30% of the monoepoxy compound, the total of the percentage being 100. To this mixture is then added the desired amount of comminuted alumina such as an added 50 to 150%. It should be recognized that the proportions of ingredients may be varied to meet particular needs and that the above merely constitutes a general guide.

In using the compositions of the invention, there is added thereto a hardening agent. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxide; carboxylic acids or anhydrides such as formic acid, oxalic acid or phthalic anhydride; Friedel-Craft metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, dicyandiamide, melamine and the like. The hardening agent is added and mixed in with the composition in order to effect hardening. The amounts vary considerably depending upon the particular agent employed. For the alkalies or phenoxides, 2 to 4 per cent is suitable. With phosphoric acid and esters thereof, good results are obtained with 1 to 10 per cent added. The amino compounds are used in amounts of about 5 to 15 per cent and the others involve addition of about 1 to 20 per cent.

In applying the composition for adhesive purposes, the glycidyl ether of the polyhydric phenol has added thereto sufficient mono-epoxy compound so that a spreadably fluid mixture is obtained to which is then added the finely divided amphoteric oxide. The hardening agent is then mixed with the composition, and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin or any combination thereof. After application and joinder of the surfaces desired to be united, the adhered articles are allowed to cure for a period of from about 30 minutes to a day or more, depending upon the hardening agent employed. In this time, the adhesive composition will set up to a solid which will permit ordinary handling thereof. Maximum strength for the adhesive layer will be reached within one or two weeks. While the application is effected at ordinary atmospheric temperature and the curing may also be permitted to occur at such temperatures, the curing may be effected in shorter times at elevated temperatures such as up to 75° C., 100° C., 150° C. or even higher in some cases. In cases where elevated curing temperature is employed, the chosen temperature is below the boiling temperature of the lowest boiling component contained in the mixture, and preferably, it is at least 20° C. below such boiling temperature.

A better understanding of the nature of the invention and its advantages will be attained by considering some particular applications and comparisons thereof.

A resin-forming mixture of epoxy compounds was prepared containing 75% of the glycidyl ether of bis-phenol prepared as described in Example I (Epoxy Resin I) and 25% of the polyglycidyl ether of glycerol of Example III (Epoxy Resin III). To this mixture was added the various substances noted in Table I below, each of which was in finely divided or powdered condition. There was then mixed in 8 parts by weight of diethylene triamine per 100 parts of the mixture of epoxy compounds as curing agent therefor.

The adhesive properties were tested with blocks of about one-quarter inch thickness consisting of linen cloth laminated together with phenolformaldehyde resin. The freshly prepared adhesive mixtures were spread on a one inch square surface of each of two phenolic blocks with the aid of a doctor blade having a clearance of 0.005 inch. The coated surfaces of the two blocks were then united and the joined blocks placed in a constant temperature room set at 77° F. Glued blocks were removed from the constant temperature room after 6 days' time and subjected to the block shear test of the Army-Navy-Civil Committee on Aircraft Design Criteria: "Wood Aircraft Inspection and Fabrication," ANC-19 (Dec. 20, 1943) discussed in an article by R. C. Rinker and G. M. Kline, Modern Plastics, vol. 23, p. 164, 1945. The shear strength of phenolic blocks glued with the different compositions in pounds per square inch are listed in Table I.

Since it is necessary that adhesively united articles also be resistant against shock, the impact strength of the cured compositions employed to unite aluminum was determined. The impact strength was tested on an assembly consisting of a 1½ inch diameter aluminum pipe, to the end of which was glued an aluminum disc. The glued area was approximately one-half square inch. The pipe having the disc glued to the lower end thereof was fastened in vertical position, and a 1½ pound rod was dropped for various distances at intervals of 3 inches upon the disc. A glue bond requiring a drop of 12 inches would consequently have an impact strength of approximately 3 foot-pounds per square inch.

The table gives data which demonstrates the superior shear strength and impact strength obtained with compositions of the invention containing granular alumina.

Table

| Parts Additive per 100 parts Epoxy Compounds | Shear Strength, lbs. per sq. in. | | | Impact Strength, ft. lbs. per sq. in. |
|---|---|---|---|---|
| | at Room Temp. | at 90° C. | After 1 hr. in boiling water | |
| 110 Zinc oxide | 3,640 | 645 | 3,170 | 2.8 |
| 27.5 Silica | 4,370 | 1,210 | 4,490 | 2.0 |
| 110 Alumina | 4,890 | 1,660 | 4,610 | 2.1 |
| 27.5 Calcined magnesia | 2,590 | 830 | 1,850 | 1.3 |
| 55 Wood flour | 1,060 | 220 | 2,165 | 1.3 |

The compositions of the invention are particularly adapted for use in bonding together of solid surfaces which may be of any suitable variety or combination such as wood to wood, wood to resin, resin to resin, metal to metal, metal to wood, metal to glass, glass to glass, etc. The surfaces may be either smooth or rough although in all cases it is desirable that they be clean—i. e., free of oil or grease.

A related, but different invention is described and claimed in my copending application, Serial No. 90,542, also filed April 29, 1949, namely, a composition comprising a glycidyl ether of a polyhydric phenol having a 1,2-epoxy equivalency greater than 1.0 in admixture with a substantial amount of powdered alumina, which composition, if desired, may also contain a polyglycidyl ether of a polyhydric alcohol and/or a liquid mono-epoxy compound.

I claim as my invention:

1. A composition essentially comprising glycidyl ether of a dihydric phenol having a 1,2-epoxy equivalency greater than 1.0, and a liquid epoxy compound having a boiling point of at least 100° C. wherein the epoxy group is a three-membered ring containing two vicinal saturated carbon atoms, in admixture with an added 25% to 200% of comminuted substantially water-insoluble amphoteric oxide, the percentage of added amphoteric oxide being based upon the total amount by weight of the mixture of only the two said organic constituents, which mixture contains such proportion of said liquid epoxy compound that it has a viscosity of 3 to 100 poises at 25° C.

2. A composition essentially comprising glycidyl ether of a dihydric phenol having a 1,2-epoxy equivalency greater than 1.0, and a liquid mono-epoxy compound having a boiling point of at least 100° C. wherein the epoxy group is a three-membered ring containing two vicinal saturated carbon atoms in admixture with an added 25 to 200% of a comminuted substantially water-insoluble amphoteric oxide, the percentage of added amphoteric oxide being based upon the total amount by weight of the mixture of only the two said organic constituents, which mixture contains such proportion of said liquid mono-epoxy compound that it has a viscosity between 3 and 100 poises at 25° C.

3. A composition essentially comprising glycidyl ether of a dihydric phenol having a 1,2-epoxy equivalency between 1.0 and 2.0 and a viscosity of at least 150 poises at 25° C., and a fluidizing proportion of a liquid mono-epoxy compound having a boiling point of at least 100° C. and a viscosity below 5 poises at 25° C. wherein the epoxy group is a three-membered ring containing two vicinal saturated carbon atoms in substantially uniform admixture with an added 25 to 200% of a comminuted substantially water-insoluble amphoteric oxide capable of passing a 10 mesh A. S. T. M. screen, the percentage of added amphoteric oxide being based upon the total amount by weight of the mixture of only the two said organic constituents, which mixture contains such proportion of said liquid mono-epoxy compound that it has a viscosity of 30 to 100 poises at 25° C.

4. A composition essentially comprising glycidyl ether of a bis-(2-hydroxyphenyl)-2,2-propane having a 1,2-epoxy equivalency between 1.0 and 2.0 and a viscosity of at least 150 poises at 25° C., and a fluidizing proportion of a liquid mono-epoxy compound having a boiling point of at least 100° C. and a viscosity below 5 poises at 25° C. wherein the epoxy group is a three-membered ring containing two vicinal saturated carbon atoms in substantially uniform admixture with an added 25 to 200% of a comminuted substantially water-insoluble amphoteric oxide capable of passing a 10 mesh A. S. T. M. screen, the percentage of added amphoteric oxide being based upon the total amount by weight of the mixture of only the two said organic constituents, which mixture contains such proportion of said liquid mono-epoxy compound that it has a viscosity of 30 to 100 poises at 25° C.

5. A composition essentially comprising glycidyl ether of a dihydric phenol having a 1,2-epoxy equivalency greater than 1.0, and a fluidizing proportion of a liquid polyglycidyl ether of a polyhydric alcohol in admixture with an added 25 to 200% of a granulated substantially water-insoluble amphoteric oxide, the percentage of added amphoteric oxide being based upon the total amount by weight of the mixture of only the two said ethers, which mixture contains such proportion of said liquid polyglycidyl ether that it has a viscosity of 30 to 100 poises at 25° C.

6. A composition essentially comprising glycidyl ether of a dihydric phenol having a 1,2-epoxy equivalency between 1.0 and 2.0 and a Durran's Mercury method softening point of 10° C. to 110° C., and a liquid monoglycidyl ether having a viscosity below 5 poises at 25° C. present in such proportion that the mixture has a viscosity of 30 to 100 poises at 25° C., this mixture having admixed therewith an added 25 to 200% of a substantially water-insoluble granular amphoteric oxide capable of passing a 10 mesh A. S. T. M. screen, which percentage of added amphoteric oxide is based upon the total amount by weight of only said organic constituents.

7. A composition essentially comprising 50 to 80 parts by weight of glycidyl ether of a dihydric phenol having a 1,2-epoxy equivalency between 1.0 and 2.0, 10 to 40 parts of a liquid polyglycidyl ether of a polyhydric alcohol, and 1 to 30 parts of a liquid mono-epoxy compound having a boiling point of at least 100° C., the sum of the parts being 100 and the whole being in admixture with an added 50% to 125% of substantially water-insoluble comminuted amphoteric oxide, which percentage of added amphoteric oxide is based upon the total amount by weight of only said organic constituents.

8. A composition essentially comprising about 75 parts by weight of glycidyl ether of bis-(4-hydroxy phenyl)-2,2-propane having a melting point of about 27° C. by Durran's Mercury Method and a 1,2-epoxy equivalency between 1.0 and 2.0, about 25 parts of polyglycidyl ether of glycerol having a 1,2-epoxy equivalency of about 2.2, and about 10 parts of allyl glycidyl ether in substantially uniform admixture with about 100 parts of a comminuted amphoteric oxide capable of passing a 10 mesh A. S. T. M. screen which has a water solubility of less than 0.01%, the composition containing a total of about 210 parts of said ingredients.

QUENTIN T. WILES.

REFERENCES CITED

The following references are of record in the file of this patent:

UNITED STATES PATENTS

| Number | Name | Date |
|---|---|---|
| 2,324,483 | Castan | July 20, 1943 |
| 2,444,333 | Castan | June 29, 1948 |
| 2,450,234 | Evans et al. | Sept. 28, 1948 |
| 2,467,171 | Werner et al. | Apr. 12, 1949 |